(12) United States Patent
Yang et al.

(10) Patent No.: US 6,990,529 B2
(45) Date of Patent: Jan. 24, 2006

(54) UNIFIED ALGORITHM FOR FRAME SCHEDULING AND BUFFER MANAGEMENT IN DIFFERENTIATED SERVICES NETWORKS

(75) Inventors: Brian Yang, Monterey Park, CA (US);
Craig I. Barrack, Irvine, CA (US);
Linghsiao Wang, Irvine, CA (US)

(73) Assignee: Zarlink Semiconductor V.N., Inc., Irvine, CA (US)

( * ) Notice: Subject to any disclaimer, the term of this patent is extended or adjusted under 35 U.S.C. 154(b) by 900 days.

(21) Appl. No.: 09/792,152

(22) Filed: Feb. 22, 2001

(65) Prior Publication Data

US 2001/0051992 A1    Dec. 13, 2001

Related U.S. Application Data

(60) Provisional application No. 60/184,557, filed on Feb. 24, 2000.

(51) Int. Cl.
*G06F 13/00* (2006.01)

(52) U.S. Cl. .................................. 709/235; 709/232
(58) Field of Classification Search .............. 709/226, 709/233, 235, 232, 224, 223
See application file for complete search history.

(56) References Cited

U.S. PATENT DOCUMENTS

| | | | | |
|---|---|---|---|---|
| 5,434,848 | A | * | 7/1995 | Chimento et al. .......... 370/232 |
| 6,023,456 | A | * | 2/2000 | Chapman et al. .......... 370/252 |
| 6,292,834 | B1 | * | 9/2001 | Ravi et al. ................. 709/233 |
| 6,519,263 | B1 | * | 2/2003 | Huth .......................... 370/444 |
| 6,538,989 | B1 | * | 3/2003 | Carter et al. ............... 370/229 |
| 6,539,024 | B1 | * | 3/2003 | Janoska et al. ............ 370/412 |
| 6,744,767 | B1 | * | 6/2004 | Chiu et al. ............... 370/395.21 |
| 2001/0053149 | A1 | * | 12/2001 | Mo et al. .................... 370/389 |
| 2003/0135632 | A1 | * | 7/2003 | Vrzic et al. ................ 709/231 |

FOREIGN PATENT DOCUMENTS

WO    WO 9913624 A1  *  3/1999

OTHER PUBLICATIONS

Chih-Ming Wu; Performance Evaluation of Frame Discard Strategies in ATM Networks; 1st IEEE International Conference on ATM, 1998; pp. 473-476; Jun., 1998.*

Yonghwan Kim et al.; Performance Analysis of Data Packet Discarding in ATM Networks; IEEE/ACM Transactions on Networking; vol. 7, Issue 2; pp. 216-227; Apr. 1999.*

J.Y. Lee et al.; Performance Analysis of an Input and Output Queueing Packet Switch with a Priority Packet Discarding Scheme; IEE Proceedings—Communications; vol. 142, Issue 2; pp. 67-74; Apr. 1995.*

EPO International Search Report dated Jun. 22, 2001.

(Continued)

*Primary Examiner*—Kenneth R. Coulter
(74) *Attorney, Agent, or Firm*—Lawrence E. Laubscher, Jr.

(57) ABSTRACT

A frame forwarding and discard architecture in a Differentiated Services network environment. The architecture comprises a discard logic for discarding a frame from a stream of incoming frames of the network environment in accordance with a discard algorithm, the frame being discarded if a predetermined congestion level in the network environment has been reached, and a predetermined backlog limit of a queue associated with the frame, has been reached. Scheduling logic is also provided for scheduling the order in which to transmit one or more enqueued frames of the network environment.

30 Claims, 3 Drawing Sheets

OTHER PUBLICATIONS

Mudassir Tufail, et al.; *Attaining per Flow QOS With Class-Based Differentiated Services*, Proceedings of the SPIE, Sep. 20, 1999.

S. Fahmy, et al.; *Quality of Service for Internet Traffic Over ATM Service Categories, Computer Communications*, vol. 22, No. 14, Sep. 15, 1999.

M. May, et. al.; *Simple Performance Models of Differentiated Services Schemes For the Internet*, New York, NY, Mar. 21-25, 1999, New York, NY: IEEE,US, Mar. 21, 1999.

P. Goransson, *Bandwidth Reservation On A Commercial Router*, Computer Networks and ISDN Systems, vol. 28, No. 3, 1996.

* cited by examiner

UNIFIED ALGORITHM FOR FRAME SCHEDULING AND BUFFER MANAGEMENT IN DIFFERENTIATED SERVICES NETWORKS

This application claims priority under 35 U.S.C. § 119(e) from U.S. Provisional Patent application Ser. No. 60/184,557 filed on Feb. 24, 2000, and entitled "Unified Algorithm For Frame Scheduling And Buffer Management In Differentiated Services Networks."

BACKGROUND OF THE INVENTION

1. Technical Field of the Invention

This invention is related to network switches, and more specifically, frame forwarding techniques employed therein.

2. Background of the Art

Differentiated Services, considered a "soft" approach to Quality of Service, is a relatively new concept in the Internet community. Differentiated Services are a set of technologies proposed by the IETF (Internet Engineering Task Force) which would allow Internet and other IP-based network service providers to offer differentiated levels of service, for an additional charge, to individual customers and information streams provided thereto. Under this regime, the header of each frame which enters a network router contains a marker which indicates the level of service that the network router would apply to such frame during transmission. The network router then applies the corresponding differentiated grades of service to the various frame which enter on the various ports. With the Differentiated Services approach, service providers then offer and provide to certain customers (not a hard and fast guarantee), a preferential grade of service for all frame traffic in accordance with the appropriate frame markers contained in the frame header. The more preferential grades of service offer lower frame latency (i.e., frame delay). During times of frame congestion, those preferentially-marked frames would receive preferential service.

Current Differentiated Services forwarding mechanisms are inadequate because frame delay and bandwidth isolation cannot be simultaneously assured without severely underutilizing the system resources in the worst case. What is needed to provide simultaneous latency and bandwidth guarantees is a frame forwarding scheme which combines both buffer management and transmission scheduling.

SUMMARY OF THE INVENTION

The present invention disclosed and claimed herein, in one aspect thereof, comprises a frame scheduling and discard architecture in a Differentiated Services network environment. The architecture comprises a discard logic for discarding a frame from a stream of incoming frames of the network environment in accordance with a discard algorithm, the frame being discarded if a predetermined congestion level in the network environment has been reached, and a predetermined backlog limit of a queue associated with the frame, has been reached. Scheduling logic is also provided for scheduling the order in which to transmit one or more enqueued frames of the network environment.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

The disclosed novel scheme preferably combines both measurable Quality of Service (QoS) criteria, such as delay and bandwidth, as well as buffer management, in a unified approach for frame forwarding in a Differentiated Services environment.

QoS is an all-encompassing term for which different people have different interpretations. In general, the approach to QoS described herein is based upon several assumptions: that the offered traffic pattern is unknown, the incoming traffic is not policed or shaped (however, if the incoming traffic is policed or shaped, additional assurances about switch performance may be made), and the network manager knows the applications (or traffic types) utilized on the network, such as voice, file transfer, or web browsing, and their relative importance. The term "shaped" or "shaping" is defined as the process of controlling (or pacing) traffic flow to prevent overflow of a downstream device by limiting traffic flow to that which more closely matches the input bandwidth capabilities of the downstream device. Policing is similar to shaping, however, traffic that exceeds the configured rate is normally discarded, instead of being buffered. With this application knowledge, the network manager can then subdivide the applications into classes, and set up a service-level agreement with each. The service-level agreement, for example, may consist of bandwidth or latency assurances per class.

A class is capable of offering traffic that exceeds the contracted bandwidth. A well-behaved class offers traffic at a rate no greater than the agreed-upon rate. By contrast, a misbehaving class offers traffic that exceeds the agreed-upon rate. A misbehaving class is formed from an aggregation of misbehaving microflows. To achieve high link bandwidth utilization, a misbehaving class is allowed to use any idle bandwidth. However, such leniency must not degrade the QoS received by well-behaved classes.

The following Table 1 illustrates a sample grid of six traffic types, where each type may have its own distinct properties and applications.

TABLE 1

Sample Grid of Six Traffic Types

| Class $C_n$ Goals | Total Assured Bandwidth | Low Drop Probability (Low Drop) | High Drop Probability (High Drop) |
|---|---|---|---|
| Highest transmission priority - $C_3$ | 40 Mbps | Apps: phone calls (VoIP), circuit emulation Latency: <1 ms Drop: no drop, if $C_3$ not oversubscribed | Apps: training video Latency: <1 ms Drop: No drop, if $C_3$ not oversubscribed, otherwise, dropped first |
| Middle transmission priority - $C_2$ | 35 Mbps | Apps: interactive apps, web business Latency: <4 ms Drop: no drop, if $C_2$ not oversubscribed | Apps: non-critical interactive apps Latency: <4 ms Drop: no drop, if $C_2$ not oversubscribed; otherwise, dropped first |
| Low transmission priority - $C_1$ | 25 Mbps | Apps: e-mail, file backups Latency: <16 ms desired, but not critical Drop: no drop, if $C_1$ not oversubscribed | Apps: casual web browsing Latency: <16 ms desired, but not critical Drop: no drop, if $C_1$ not oversubscribed; otherwise, dropped first |
| Total | 100 Mbps | | |

As illustrated in Table 1, the traffic types (i.e., phone calls, circuit emulation, training videos, critical and non-critical interactive applications, web businesses, e-mails, file backups, and casual web browsing) are structured into three classes ($C_1$, $C_2$, and $C_3$), each receiving bandwidth assurances and latency bounds. Class $C_3$, the highest priority transmission class, requires that all frames be transmitted in less than 1 ms, and receives 40 Mbps of the 100 Mbps of bandwidth (40%) at that port. Class $C_2$, the middle transmission priority class, receives 35 Mbps of the 100 Mbps total bandwidth (or 35%) at that port, and requires that all frames be transmitted in less than 4 ms. Finally, class $C_1$, the lowest transmission priority class, receives 25 Mbps of the 100 Mbps total bandwidth (or 25%) at that port, and requires that frames be transmitted in less than 16 ms, before dropping occurs.

In addition, each transmission class ($C_1$, $C_2$, and $C_3$) has two subclasses; high-drop and low-drop. Well-behaved users should rarely lose frames. However, poorly-behaved users (i.e., users who send frames at too high of a rate) will have frames dropped, and the first to be discarded will be those frames meeting the high-drop criteria. If this is insufficient to resolve the congestion, some frames meeting the low-drop criteria are dropped, and in the worst case, all frames will be dropped.

Table 1 shows that the class applications, respective priorities, and delay and drop criteria, may be structured in any manner desired. For example, casual web browsing fits into the category of high-drop, high-latency-tolerant traffic, whereas VoIP phone calls fit into the category of low-drop, low-latency traffic.

In addition to the aforementioned three classes ($C_1$, $C_2$, and $C_3$), it is possible to implement more transmission classes with other delay bounds and minimum bandwidth assurances. Furthermore, in another variation, best-effort traffic can form a lowest class that receives bandwidth only when the other classes have no traffic at all. It is also possible to add a still higher transmission priority class that has strict priority over the other three (or more); that is, if this class has even one frame to transmit, then it is transmitted first.

Note, however, that in this particular embodiment, each 10/100 Mbps port supports three total classes ($C_1$, $C_2$, and $C_3$).

In a 1 Gbps implementation, each port might support eight classes ($C_8$–$C_1$), because of the greater QoS granularity that could be required by a higher wire speed. For example, a default configuration might have six delay-bounded queues $Q_8$-$Q_3$ (corresponding to classes $C_8$–$C_3$, respectively) and two best-effort queues $Q_2$ and $Q_1$ (for classes $C_2$ and $C_1$, respectively). The delay bounds for the 1 Gbps port could be, for example, 0.16 ms for $C_8$ and $C_7$, 0.32 ms for $C_6$, 0.64 ms for $C_5$, 1.28 ms for $C_4$, and 2.56 ms for $C_3$. Best-effort traffic is only served when there is no delay-bounded traffic to be served. For the 1 Gbps port, where there are two best-effort queues, the queue of the higher class has the higher priority (i.e., $C_2$ has strict priority over $C_1$). Again, this is just one example. Note that the disclosed architecture is compatible with IETF classes proposed by the Internet Engineering Task Force.

To cope with the uncertainty of not knowing the mix of incoming traffic, a delay assurance algorithm dynamically adjusts the scheduling and dropping criteria, guided by the queue occupancies and the due dates of the queue HOL frames. As a result, latency bounds are assured for all admitted frames with high confidence, even in the presence of system-wide congestion. The delay assurance algorithm identifies misbehaving classes and intelligently discards frames at no detriment to well-behaved classes. The algorithm also differentiates between high-drop and low-drop traffic with a weighted random early detection (WRED) approach. This approach is designed to avoid frame congestion in internetworks before it becomes a problem. A random early detection algorithm monitors traffic load at selected points along a network and randomly discards frames when congestion begins to increase. In response to the upper layer detecting the discarded frames, frame transmission will be slowed.

Figure 1:
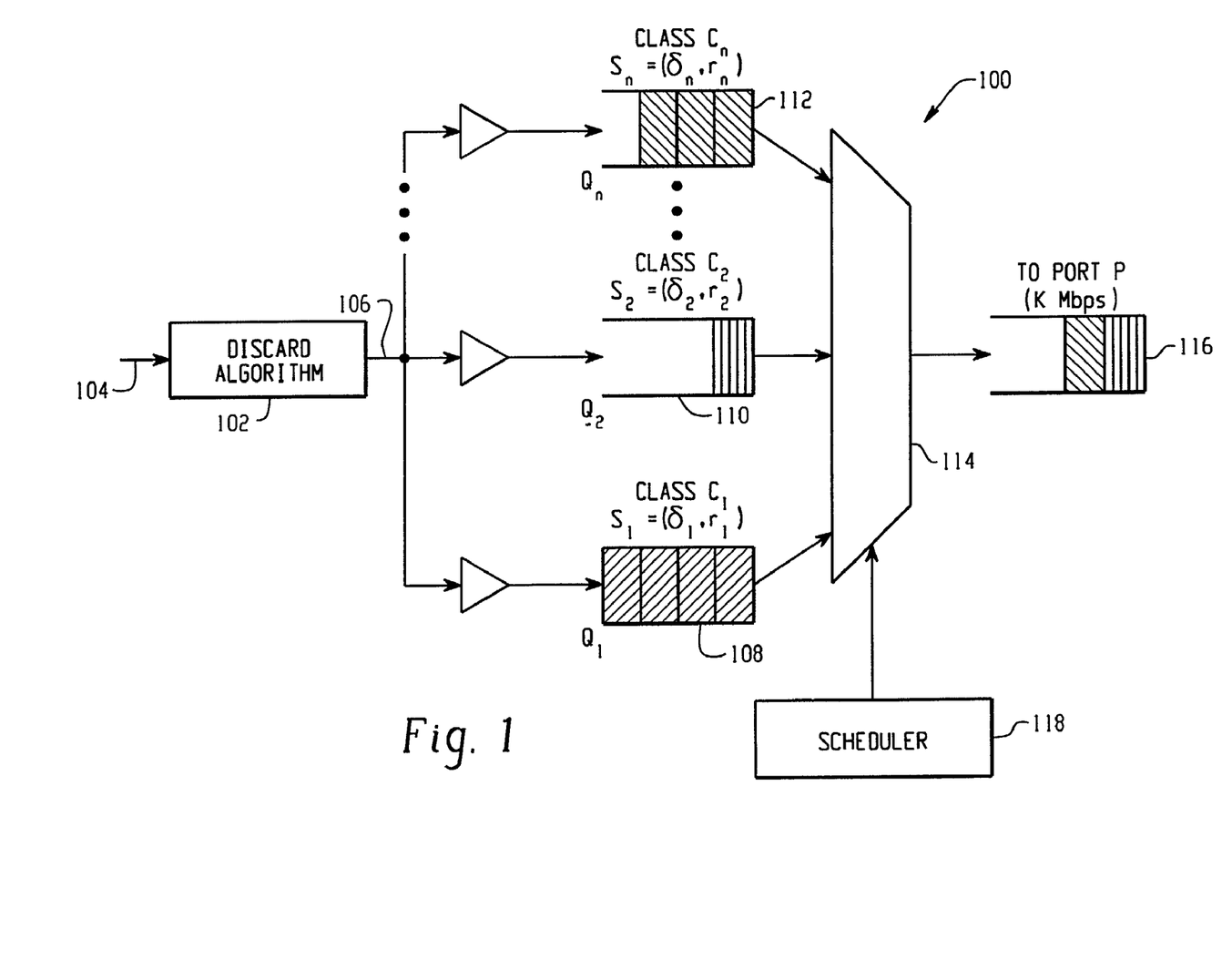
FIG. 1 illustrates a general block diagram of a frame forwarding system in accordance with a disclosed embodiment.

Referring now to FIG. 1, there is illustrated a block diagram which provides a high-level view of a disclosed embodiment. The disclosed novel forwarding mechanism comprises two intertwined parts: buffer management, which operates in accordance with a discard algorithm for determining the admittance or discarding of incoming frames; and transmission scheduling, for determining the sequence of frame departure. The importance of this intertwining can be summarized as follows: bandwidth, delay, and buffering are mathematically related by Bandwidth Received ∝ Queue Size/Delay Experienced. The unified scheme, through scheduling and buffer management, controls the Delay Experienced and Queue Size. As a consequence of this fact and the mathematical relationship hereinabove, the unified scheme also modulates Bandwidth Received per class.

Referring again to FIG. 1, a frame forwarding system 100 comprises a discard logic 102 operable in accordance with a discard algorithm which monitors an incoming bit stream 104. An output 106 of the discard logic 102 flows to one or more queues 108, 110 and 112 (also denoted as queues $Q_1$, $Q_2$, ..., $Q_n$) which correspond to respective classes $C_1$, $C_2$, ..., $C_n$ of traffic. The queues 108, 110 and 112 temporarily store frames according to the class of frame traffic to which each is assigned, and each outputs frames to a multiplexer logic 114 for ultimate output at an output queue 116, which has total bandwidth capacity of K Mbps. For example, class $C_1$, the lowest transmission priority class, has associated therewith a service-level agreement $S_1$ which is defined by a delay bound parameter ($\delta_1$) and a bandwidth parameter ($r_1$). If the number of frames enqueued in the queue 108 (also designated $Q_1$) cannot be transmitted within the time designated by the delay parameter ($\delta_1$), there is some probability that frames associated with that class will need to be dropped in order to prevent congestion. Similarly, there is illustrated that the class $C_2$, the next highest transmission priority class, has associated therewith a service-level agreement $S_2$ which is defined by a delay bound parameter ($\delta_2$) and a bandwidth parameter ($r_2$). If the number of frames enqueued in the queue 110 (also designated $Q_2$) cannot be transmitted within the time designated by the delay parameter ($\delta_2$), there is some probability that frames associated with that class will need to be dropped in order to prevent congestion.

Where the illustrated embodiment has a plurality of classes, the highest transmission priority class $C_n$ has associated therewith a service-level agreement $S_n$ which is defined by a delay bound parameter ($\delta_n$) and a bandwidth parameter ($r_n$). If the number of frames enqueued in the queue 112 (also designated $Q_n$) cannot be transmitted within the time designated by the delay parameter ($\delta_n$), there is some probability that frames associated with that class will need to be dropped in order to prevent congestion. The output queue 116 temporarily stores the frames received from the various class queues 108, 110 and 112, and outputs frames of the various classes $C_1$, $C_2$, ..., $C_n$ to a port P (not shown). The multiplexer 114 is controlled by a scheduling logic 118 which determines the sequence of frame departure from the various class queues 108, 110 and 112.

A more generalized delineation of the novel system follows. Assume that port P serves n service classes of traffic, labeled $C_1$, $C_2$, ..., $C_n$. For each service class $C_1$, the network provider has negotiated a service-level agreement $S_i$, such that $S_i=(\delta_i, r_i)$, where $\delta_i$ is the guaranteed maximum delay experienced by any admitted frame from class $C_i$, and $r_i$ is the guaranteed minimum bandwidth allocation for class $C_i$ over time. The classes are defined such that the guaranteed maximum delay $\delta_1$ of class $C_1$ is greater than or equal to the guaranteed maximum delay $\delta_2$ of class $C_2$, and that the guaranteed maximum delay $\delta_2$ of class $C_2$ is greater than or equal to the guaranteed maximum delay $\delta_3$ of class $C_3$, and so on.(i.e., $\delta_1 \geq \delta_2 \geq \ldots \geq \delta_n$). The disclosed scheme advantageously simultaneously satisfies both the delay and bandwidth constraints of the service-level agreements $S_i$ for all i, regardless of the offered traffic pattern.

Delay bounded scheduling is now discussed in the context of the 10/100 Mbps port having three delay-bounded classes ($C_3$, $C_2$, and $C_1$). However, other implementations having more classes can be structured similarly. When scheduling for bounded delay, in the case of the 10/100 Mbps port of Table 1, each frame enqueued in the three transmission scheduling queues $Q_1$–$Q_3$ (of classes $C_1$, $C_2$, and $C_3$) contains an arrival time stamp. The scheduling decision is made when a frame reaches the head-of-line (HOL) position in the queue, and according to the time stamp of the HOL frame of each queue. In the sample rules provided hereinbelow, delay is defined to be the difference between the stamped arrival time of a job (or frame) and the current time. Obviously, if there are no frames awaiting transmission for a particular class, then that class cannot be selected.

Figure 2:
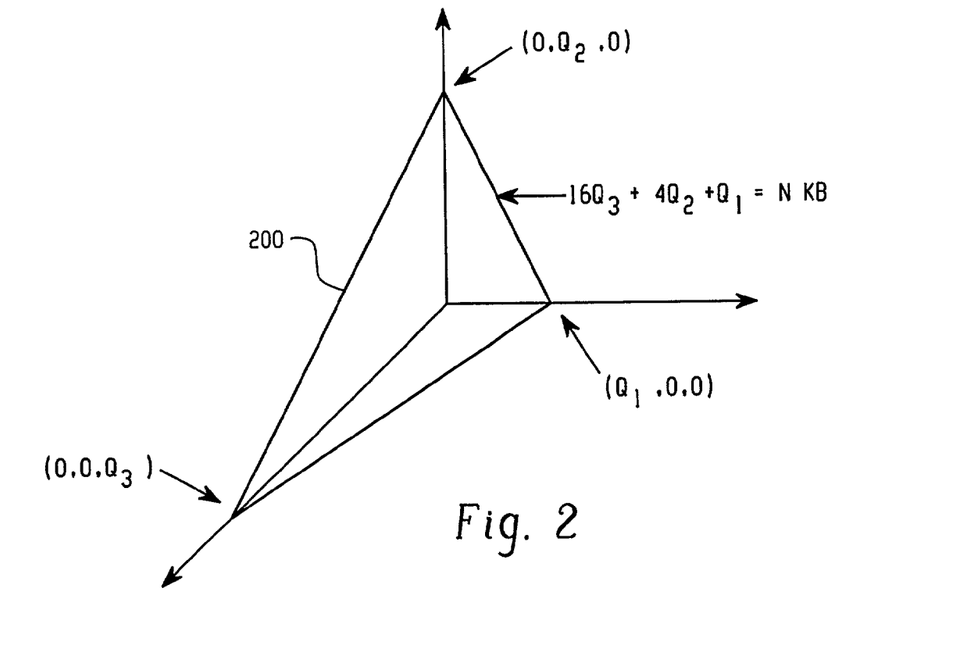
FIG. 2 illustrates a graph of congestion plane defined by the system of FIG. 1.

Referring now to FIG. 2, there is illustrated the concept of a congestion plane 200 in Euclidean space, in accordance with a disclosed embodiment. Let $Q_i$ be the queue backlog (measured in total bytes) for the output port P for each service class $C_i$ awaiting forwarding. Let $\lambda_i=\delta_1/\delta_i$, and let $D=K \cdot \delta_1$ (measured in bytes). The congestion hyperplane 200 is spanned by the set of vectors $\{Q_1, Q_2, Q_3, \ldots, Q_n\}$, and defined by equation (1);

$$\sum_i \lambda_1 Q_1 = D. \qquad (1)$$

The buffer manager 102 will discard an incoming frame destined for port P and belonging to class $C_i$, if and only if, $$\sum_i \lambda_1 Q_1 \geq D \qquad (2)$$

and, $$Q_1 > r_1 \cdot \delta_1. \qquad (3)$$

The first condition (equation (2)) indicates that the system 100 is congested, i.e., that the system 100 has surpassed the congestion plane 200. The second condition (equation (3)) indicates that class $C_i$ has already accumulated a large backlog. Even if admitted, a frame belonging to class $C_i$ has little chance of meeting its delay constraint, which is a consequence of the existing backlog and the minimum bandwidth assurances to other classes. Therefore, the incoming class i frame is discarded.

Figure 3:
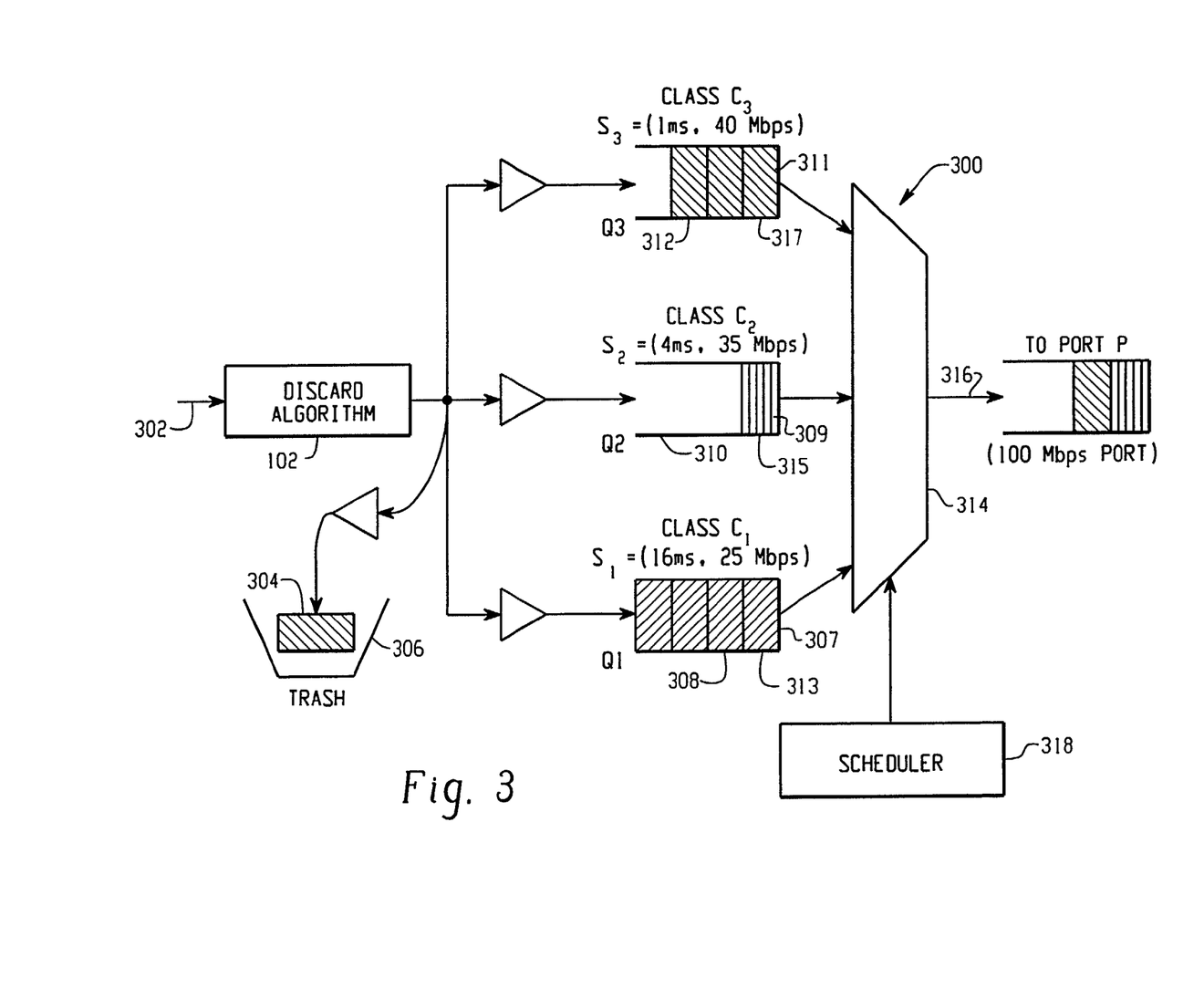
FIG. 3 illustrates a block diagram of sample frame forwarding system in accordance with Table 1.

The disclosed buffer management algorithm may be modified to include WRED, the benefits of which have been well-established in the literature. The WRED technique uses a weighted queue length to determine when the system is sufficiently congested to consider dropping one or more frames. The dropping policy must drop enough frames to keep the queue lengths below the congestion plane 200; otherwise 100% of the frames will be dropped in order to prevent congestion. Since the goal is to differentiate between high-drop and low-drop traffic, the system 100 cannot be allowed to get to the congestion plane 200, where all frames are dropped, regardless of drop precedence. Therefore, in this particular embodiment, two sub-congestion planes are defined (Level 1 and Level 2), and which are designed to achieve early congestion avoidance, such that frames may be dropped with less than 100% probability where less strict conditions are met. Referring now to FIG. 3, there is illustrated a block diagram of a sample frame forwarding system in accordance with Table 1. The frame forwarding system 300 (similar to system 100) has a 100 Mbps bandwidth, and utilizes the discard logic 102 which operates in accordance with the discard algorithm disclosed herein. The discard logic 102 monitors an incoming bit stream 302, and based upon predetermined criteria, discards selected frames 304 of the bit stream 302 into a discard bin 306 (shown for purposes of discussion, only). Admitted frames (307, 309, and 311) are then enqueued into respective classes of input queues (308, 310, and 312). For example, input queue 308 is a class $C_1$ queue (the lowest transmission priority class) having a delay bound which requires that all frames 307 be transmitted in less than 16 ms, and where class $C_1$ becomes a misbehaving class by offering traffic which exceeds the agreed-upon rate of 25 Mbps, there is some probability that some of the incoming class $C_1$ frames will be dropped to prevent congestion. Input queue 310 is a class $C_2$ queue (the intermediate transmission priority class) having a delay bound which requires that all frames 309 be transmitted in less than 4 ms, and where class $C_2$ becomes a misbehaving class by offering traffic which exceeds the agreed-upon rate of 35 Mbps, there is some probability that some of the incoming class $C_2$ frames will be dropped to prevent congestion. Lastly, input queue 312 is a class $C_3$ queue (the highest transmission priority class) having a delay bound which requires that all frames 311 be transmitted in less than 1 ms, and where class $C_2$ becomes a misbehaving class by offering traffic which exceeds the agreed-upon rate of 40 Mbps, there is some probability that some of the incoming class $C_3$ frames will be dropped to prevent congestion.

Enqueued frames (307, 309, and 311) from the respective queues (308, 310, and 312) are multiplexed with multiplexer logic 314 (similar to multiplexer logic 114) into an output bit stream 316 at a rate not to exceed 100 Mbps, the output port speed of the system 300. However, scheduling logic 318 connects to the multiplexer 314 to schedule transmission of the class frames (307, 309, and 311) from the respective class queues (308, 310 and 312). As mentioned hereinabove, each enqueued frame (307, 309, and 311) is time stamped upon arrival to the respective queue (308, 310, and 312). A scheduling decision is made when a class frame (307, 309, and 311) reaches the HOL position (313, 315, and 317) of its respective queue (308, 310, and 312), and according to the arrival time stamp of the HOL frame of each queue.

Figure 4:
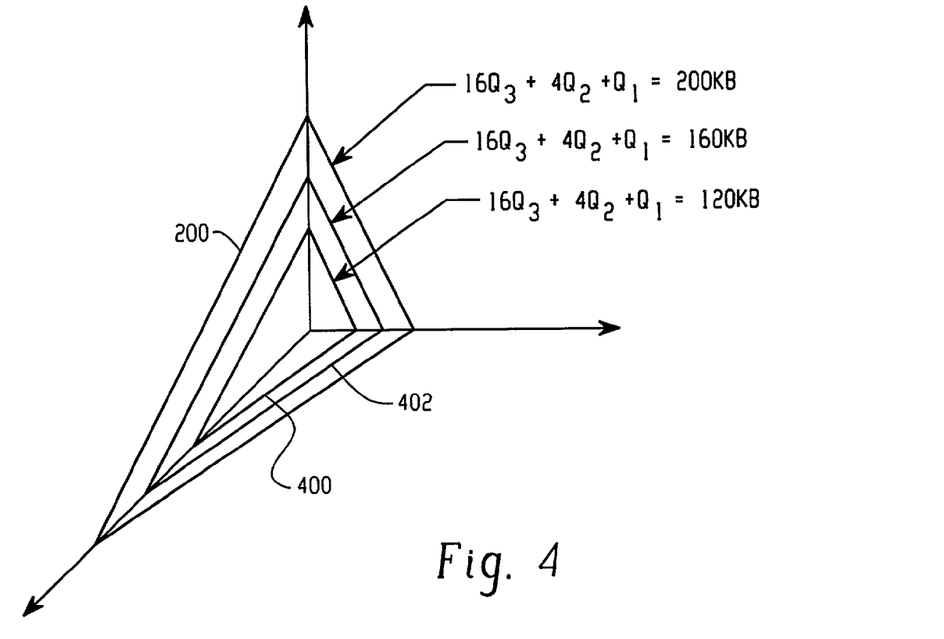
FIG. 4 illustrates a graph of the sub-congestion planes in a WRED implementation.

Referring now to FIG. 4, there is illustrated a graph of the congestion and sub-congestion planes. Note that any small number of sub-congestion planes can be defined. The Level 1 and Level 2 sub-congestion planes (400 and 402, respectively) prevent congestion by randomly dropping a percentage of high-drop frames, while still largely sparing low-drop frames. This allows high-drop frames to be discarded early, as a sacrifice for low-drop frames. In the example, there will be some probability of dropping frames when the total available queue backlog N ranges from 120 to 200 KB, and any one of the class queues $Q_1$–$Q_3$ has a backlog of buffered frames which meets or exceeds the respective queue limits of A, B, or C (in kilobytes). In the Level 1 sub-congestion plane 400, where $16Q_3+4Q_2+Q_1 \geq 120$ KB, and any one or more of the queues $Q_1$–$Q_3$ exceeds its backlog limit (A, B, and C, respectively), the low-drop-to-high-drop range varies from 0 to X %, respectively. Similarly, in the Level 2 sub-congestion plane 402, where $16Q_3+4Q_2+Q_1 \geq 160$ KB, and any one or more of the queues $Q_1$–$Q_3$ exceeds its backlog limit (A, B, and C, respectively), the low-drop-to-high-drop range varies from Y % to Z %, respectively. Finally, in the Level 3 congestion plane 200, where the congestion plane 200 is defined by $16Q_3+4Q_2+Q_1 \geq 200$ KB, both the low-drop and high-drop rules stipulate a drop of 100% of the frames.

Table 2 summarizes dropping rules utilized with WRED where various sub-congestion planes are defined for a 100 Mbps port with a maximum total queue backlog N, or in this particular example, where N=200 KB.

TABLE 2

Dropping Rules to Enforce QoS on a 10/100 Mbps Port With Three Delay-Bounded Classes

| | $C_3$ | $C_2$ | $C_1$ | Low Drop | High Drop |
|---|---|---|---|---|---|
| Level 1 N = 120 | $Q_3 \geq$ C KB | $Q_2 \geq$ B KB | $Q_1 \geq$ A KB | 0% | X% |
| Level 2 N = 160 | | | | Y% | Z% |
| Level 3 N = 200 | | | | 100% | 100% |

Note that the rules for discarding (or dropping) frames are only applied, in this particular embodiment having the delay bounds of Table 1, when $16Q_3+4Q_2+Q_1 \geq N$ KB, which will be discussed in greater detail hereinbelow.

Table 3 gives an example of combining WRED with the aforementioned discard scheme.

TABLE 3

Sample Discard Method in Combination With WRED

| | $C_3$ | $C_2$ | $C_1$ | Low Drop | High Drop |
|---|---|---|---|---|---|
| Level 1 N = 120 | $Q_3 \geq$ 5 KB | $Q_2 \geq$ 17.5 KB | $Q_1 \geq$ 50 KB | 0% | 50% |
| Level 2 N = 160 | | | | 25% | 75% |
| Level 3 N = 200 | | | | 100% | 100% |

Level 3 of Table 3 follows the rules set forth hereinabove and given the bounded delay constraints in FIG. 1. For example, according to the equations, a Class 2 frame is dropped, if and only if, $16Q_3+4Q_2+Q_1 \geq 200$ KB, and queue $Q_2$ exceeds a predetermined backlog limit, i.e., $Q_2 \geq 17.5$ KB. Level 1 and Level 2 define the sub-congestion planes (400 and 402, respectively) which were discussed hereinabove. For example, if 120 KB $\leq 16Q_3+4Q_2+Q_1 < 200$ KB, and $Q_2 \geq 17.5$ KB, then dropping will still occur with some probability. Observe that frames may be identified as high-drop or low-drop, and assigned different drop probabilities within each category on each WRED level.

As indicated in FIG. 2, in this particular embodiment having three classes $C_1$, $C_2$ and $C_3$, every point on the congestion plane 200 defines a triple of queue lengths ($Q_1$, $Q_2$, $Q_3$) that is sustainable, in the sense that all latency bounds can be satisfied if the corresponding queue lengths ($Q_1$, $Q_2$, $Q_3$) remain steady at those values. For example, one sustainable set of steady-state queue lengths, in KB, is (50, 17.5, 5). These values are derived herein; $Q_3=(r_3)(\delta_3)=(40$ Mbps$)(1$ ms$)=5$ KB; $Q_2=(r_2)(\delta_2)=(35$ Mbps$)(4$ ms$)=17.5$ KB; and $Q_1=(r_1)(\delta_1)=(25$ Mbps$)(16$ ms$)=50$ KB.

With respect to transmission scheduling, let $\Delta(F)$ be defined to be the current waiting time of frame F. Then, frame F of class i is defined to have slackness $\Psi_i(F)$, such that $\Psi_i(F)=\delta_i-\Delta(F)$. The transmission scheduling method is advantageously simple: the smaller the slackness (or slack time), the higher the transmission priority. Where the computed slack times between two or more classes of queues are equal, scheduling is provided first to the queue associated with the higher priority class (i.e., with the stricter delay constraint).

Although the preferred embodiment has been described in detail, it should be understood that various changes, substitutions and alterations can be made therein without departing from the spirit and scope of the invention as defined by the appended claims.

What is claimed is:

1. A method for guaranteeing different packet delays for different packet classes, wherein each packet class having a corresponding priority class, input queue having a queue length and a delay bound, comprising:
   receiving a packet for forwarding to an output port, the packet having a packet class determining the sum of the product of queue lengths and delay bounds for all classes;
   determining the product of the queue length and delay bound for the packet's class; and
   discarding the packet when the sum of the product of queue lengths and delay bounds for all classes exceeds a predetermined congestion plane and when the product of the queue length and delay bound for the packet's class exceeds a bandwidth allocated for the packet's class.

2. The method of claim 1, further comprising:
   forwarding the packet to a queue to an input queue for the packet class when the product of the queue length and delay bound for the packet's class exceeds the bandwidth allocated for the packet's class and when the sum of the product of queue lengths and delay bounds for all classes is less than the predetermined congestion plane.

3. The method of claim 2, further comprising:
   scheduling the packet to be forwarded to the output port from the input queue prior to the delay bound for the packet's class expires.

4. The method of claim 1, further comprising:
   forwarding the packet to a queue to an input queue for the packet class when the product of the queue length and delay bound for the packet's class is less than the bandwidth allocated forte packet's class and when the sum of the product of queue lengths and delay bounds for all classes is exceeds the predetermined congestion plane.

5. The method of claim 4, further comprising:
   scheduling the packet to be forwarded to the output port from the input queue prior to the delay bound forte packet's class expires.

6. The method of claim 1, wherein the predetermined congestion plane is defined as the sum of the product of the delay bound of each class divided by the delay bound of the highest priority class times the queue length for the class is one of less than or equal to a predetermined value.

7. The method of claim 6, wherein the predetermined value is the product of the speed of the output port times the delay bound of the highest priority class.

8. A weighted random early drop method, comprising:
   forwarding all inbound low drop packets and discarding a first fixed percentage of inbound high drop packets when the sum of products of the queue length for each class times the delay bound for the class divided by the delay bound for the highest priority class exceeds a first predetermined threshold; and
   discarding a second percentage of inbound low drop packets and a third percentage of inbound high priority packets when the sum of products of the queue length for each class times the delay bound for the class divided by the delay bound for the highest priority class exceeds a second predetermined threshold;
   wherein the first predetermined threshold is lower than the second predetermined threshold.

9. The method of claim 8, further comprising:
   discarding all inbound low drop and all inbound high priority packets when the sum of products of the queue length for each class times the delay bound for the class divided by the delay bound for the highest priority class exceeds a third predetermined threshold;
   wherein the second predetermined threshold is lower than the third predetermined threshold.

10. A method for routing packets received from an input stream to a port, the input stream having n classes where n is an integer greater than 1, and the port having a bandwidth, comprising:
    receiving a packet belonging to a class i, where i is an integer between 1 and n;
    calculating the sum of $\lambda_i Q_i$ for i equals 1 to i equals n, where $\lambda_i$ is the ratio of the delay bound for the class i, $\delta_i$, divided by the delay bound of the highest priority class $\delta_1$, and $Q_i$ is the current queue size for the class i forwarding a packet that exceeds for a class exceeding its allocated queue length defined as the product of the allocated bandwidth for the class $r_i$ and the delay bound for the class, $\delta_i$, when the sum of $\lambda_i Q_i$ is less than a predetermined threshold value.

11. The method of claim 10, wherein the predetermined threshold value is the product of the port speed and the delay bound of the highest priority class, $\delta_1$.

12. The method of claim 10, wherein the predetermined threshold value is less than the product of the port speed and the delay bound of the highest priority class, $\delta_1$.

13. A method for dynamically adjusting queue sizes for n queues, where n is an integer greater than 1, each queue corresponding to a class $C_i$, where i is an integer between 1 and n, the class having a priority based on a delay bound $\delta_i$, comprising:
    allocating each class a bandwidth, $r_i$;
    allocating each class an allocated queue size determined by the product of the class bandwidth and the class delay bound, $r_i \delta_i$;
    determining a congestion plane as a sum of the products for i equals 1 to n of a priority factor, $\lambda_i$, the priority factor based on the delay bound of the class $\delta_i$ divided by the delay bound of the highest priority class $\delta_1$ and a current queue length $Q_i$, wherein the sum $\lambda_i Q_i$ for i equals 1 to n is one equal to a predetermined threshold;
    increasing the queue size for a class i when a packet is received for class i when the increase of queue size does not exceed the congestion plane.

14. The method of claim 13 wherein the predetermined threshold is the product of a port speed of an output port connected to the n queues and the delay bound of the highest priority class, $\delta_i$.

15. The method of claim 13, further comprising:
    decreasing a queue size $Q_i$ for a queue that is larger than its allocated queue size $r_i \delta_i$ when a packet is received for a higher priority class and the sum $\lambda_i Q_i$ for i equals 1 to n is one greater than the predetermined threshold.

16. An apparatus for guaranteeing different packet delays for different packet classes, wherein each packet class having a corresponding priority class, input queue having a queue length and a delay bound, comprising:

means adapted for receiving a packet for forwarding to an output port, the packet having a packet class means adapted for determining the sum of the product of queue lengths and delay bounds for all classes;

means adapted for determining the product of the queue length and delay bound for the packet's class; and means adapted for discarding the packet when the sum of the product of queue lengths and delay bounds for all classes exceeds a predetermined congestion plane and when the product of the queue length and delay bound for the packet's class exceeds a bandwidth allocated for the packet's class.

17. The apparatus of claim 16, further comprising:

means adapted for forwarding the packet to a queue to an input queue for the packet class when the product of the queue length and delay bound for the packet's class exceeds the bandwidth allocated for the packet's class and when the sum of the product of queue lengths and delay bounds for all classes is less than the predetermined congestion plane.

18. The apparatus of claim 16, further comprising:

scheduling the packet to be forwarded to the output port from the input queue prior to the delay bound for the packet's class expires.

19. The apparatus of claim 16, further comprising:

means adapted for forwarding the packet to a queue to an input queue for the packet class when the product of the queue length and delay bound for the packet's class is less than the bandwidth allocated for the packet's class and when the sum of the product of queue lengths and delay bounds for all classes is exceeds the predetermined congestion plane.

20. The apparatus of claim 19, further comprising:

means adapted for scheduling the packet to be forwarded to the output port from the input queue prior to the delay bound for the packet's class expires.

21. The apparatus of claim 19, wherein the predetermined congestion plane is defined as the sum of the product of the delay bound of each class divided by the delay bound of the highest priority class times the queue length for the class is one of less than or equal to a predetermined value.

22. The apparatus of claim 21, wherein the predetermined value is the product of the speed of the output port times the delay bound of the highest priority class.

23. An apparatus configured to perform a weighted random early drop method, comprising:

means adapted for forwarding all inbound low drop packets and discarding a first fixed percentage of inbound high drop packets when the sum of products of the queue length for each class times the delay bound for the class divided by the delay bound for the highest priority class exceeds a flint predetermined threshold; and means adapted for discarding a second percentage of inbound low drop packets and a third percentage of inbound high priority packets when the sum of products of the queue length for each class times the delay bound for the class divided by the delay bound for the highest priority class exceeds a second predetermined threshold;

wherein the first predetermined threshold is lower than the second predetermined threshold.

24. The apparatus of claim 23, further comprising:

means adapted for discarding all inbound low drop and all inbound high priority packets when the sum of products of the queue length for each class times the delay bound for the class divided by the delay bound for the highest priority class exceeds a third predetermined threshold;

wherein the second predetermined threshold is lower than the third predetermined threshold.

25. An apparatus for guaranteeing different packet delays for n different packet classes, wherein n is an integer greater than 1, comprising:

n input queues, each of the n input queues is assigned to a corresponding packet class;

discard logic adapted to receiving a packet for forwarding to an output port, the packet belonging to a class i, that is one of the n packet classes;

the discard logic being suitably adapted for determining the sum of the product of queue lengths and delay bounds for all classes;

the discard logic being suitably adapted for determining the product of the queue length and delay bound for the packet's class; and the discard logic configured for discarding the packet when the sum of the product of queue lengths and delay bounds for all classes exceeds a predetermined congestion plane and when the product of the queue length and delay bound for the packet's class exceeds a bandwidth allocated for the packet's class.

26. The method of claim 25, further comprising:

the discard logic configured for forwarding the packet to a queue to an input queue for the packet class when the product of the queue length and delay bound for the packet's class exceeds the bandwidth allocated for the packet's class and when the sum of the product of queue lengths and delay bounds for all classes is less than the predetermined congestion plane.

27. The apparatus of claim 26, further comprising:

scheduling logic operative to scheduling the packet to be forwarded to the output port from the input queue prior to the delay bound for the packet's class expires.

28. The apparatus of claim 27, further comprising:

a multiplexer having n inputs and one output, the n inputs coupled to the n input queues and the output connected to an output port;

wherein the scheduling logic is operative to control the multiplexer for forwarding a packet from one of the n input queues to the output port.

29. The apparatus of claim 25, further comprising:

the discard logic configured for forwarding the packet to a queue to an input queue for the packet class when the product of the queue length and delay bound for the packet's class is less than the bandwidth allocated for the packet's class and when the sum of the product of queue lengths and delay bounds for all classes is exceeds the predetermined congestion plane.

30. The apparatus of claim 29, further comprising:

scheduling logic for scheduling the packet to be forwarded to the output port from the input queue prior to the delay bound for the packet's class expires.

* * * * *